United States Patent [19]

Schocker et al.

[11] Patent Number: 6,000,710

[45] Date of Patent: Dec. 14, 1999

[54] TRAILER COUPLER LOCK

[75] Inventors: Richard L. Schocker, Jefferson; Edward W. Ebey, Wausau, both of Wis.

[73] Assignee: Fulton Performance Products, Inc., Mosinee, Wis.

[21] Appl. No.: 08/891,926

[22] Filed: Jul. 14, 1997

[51] Int. Cl.[6] ....................................................... B60D 1/06
[52] U.S. Cl. ............................................. 280/507; 280/511
[58] Field of Search ..................................... 280/511, 507, 280/513

[56] References Cited

U.S. PATENT DOCUMENTS

| | | |
|---|---|---|
| 195,025 | 9/1877 | Lane . |
| 2,167,520 | 7/1939 | Claud-Mantle . |
| 2,498,776 | 2/1950 | Weiss . |
| 2,696,392 | 12/1954 | Case . |
| 3,009,714 | 11/1961 | Lamberson . |
| 3,446,520 | 5/1969 | Gibson et al. . |
| 3,492,024 | 1/1970 | Cooper . |
| 3,567,253 | 3/1971 | Puydt et al. . |
| 3,659,876 | 5/1972 | Melton . |
| 3,694,006 | 9/1972 | Good et al. . |
| 3,792,432 | 2/1974 | Ellis et al. . |
| 3,794,356 | 2/1974 | Hollis, Jr. . |
| 4,241,936 | 12/1980 | Carruthers et al. . |
| 4,444,410 | 4/1984 | Martin . |
| 4,657,276 | 4/1987 | Hamerl . |
| 4,699,395 | 10/1987 | Hale . |
| 4,817,979 | 4/1989 | Goettker . |
| 5,133,571 | 7/1992 | Polito . |

*Primary Examiner*—Lanna Mai
*Assistant Examiner*—Andrew J. Fischer
*Attorney, Agent, or Firm*—Edgar A. Zarins; Lloyd D. Doigan

[57] ABSTRACT

A spring-biased mechanism for a trailer coupler to positively connect a trailer to a towing vehicle. The coupler is attached to a tongue of a trailer and adapted to receive a hitch ball of a towing vehicle. A locking assembly mounted within the coupler prevents withdrawal of the hitch ball from the coupler housing to prevent inadvertent separation of the trailer from the towing vehicle. The lock includes a rotatable pin extending transversely through the coupler housing to selectively prevent withdrawal of the hitch ball. The rotatable pin is connected to a spring-biased lever positioned externally of the coupler housing. In addition to pivoting between a locked and an open position to rotate the pin, the lever can be laterally shifted to be held open against the biasing of the spring allowing insertion of the ball. To lock onto the hitch ball, the lever can be pulled outwardly causing the spring to bias the lever to the locked position.

3 Claims, 3 Drawing Sheets

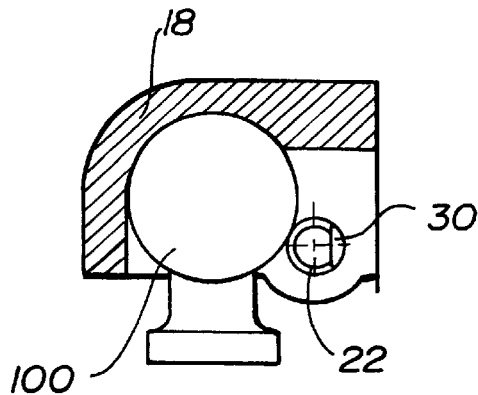 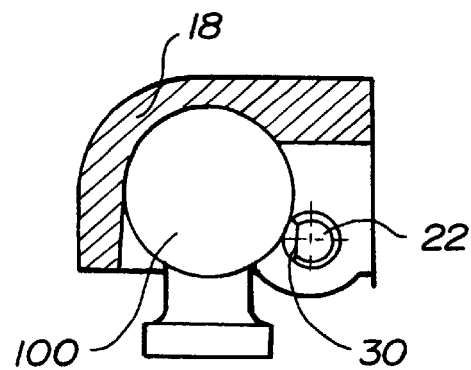
*Fig-5A*  *Fig-5B*
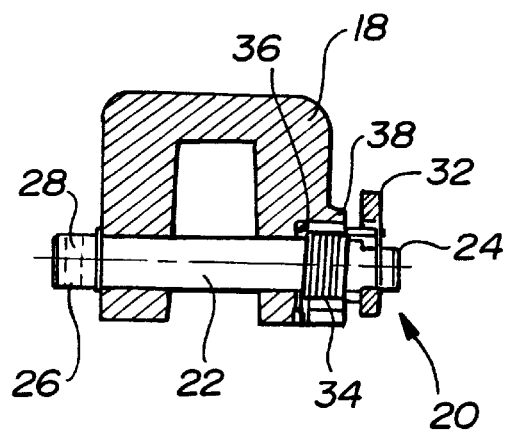
*Fig-6*

6,000,710

TRAILER COUPLER LOCK

BACKGROUND OF THE INVENTION

1. Field of the Invention

This invention relates to coupler locks for connecting a trailer coupler to a hitch ball of a towing vehicle and, in particular, to a spring-biased coupler lock for positively engaging the hitch ball to prevent inadvertent separation of the trailer from the towing vehicle.

2. Description of the Prior Art

With the increased popularity of recreational vehicles, manufacturers continue to improve the ease and reliability of couplers for connecting a trailer to a towing vehicle. The most popular coupler assembly includes a hitch ball mounted to a towing vehicle and adapted to be received by a coupler housing. A lock mechanism is employed to prevent inadvertent withdrawal of the ball from the coupler housing. However, the lock mechanism should allow simple disconnection and reconnection of the trailer to the towing vehicle. Many locks are cumbersome and require at least one hand to operate the lock during insertion of the hitch ball.

The prior known coupler locks include an element which interferes with the withdrawal of the hitch ball from the coupler housing. In a well known lock, a spoon is longitudinally shiftable beneath the ball to prevent withdrawal. However, in order to ensure locking of the coupler, the user must move the latch mechanism to the locked position. In the event the latch is not engaged, the trailer could decouple from the towing vehicle. Spring-biased couplers are known however, they require the user to hold the mechanism in an unlocked position as the coupler housing is positioned over the hitch ball.

SUMMARY OF THE PRESENT INVENTION

The present invention overcomes the disadvantages of the prior known trailer coupler locks by providing a spring-biased lock which can be maintained in the open position as the hitch ball is inserted into the coupler housing.

The trailer coupler lock of the present invention is incorporated into a coupler housing adapted to be secured to a tongue of a trailer in a well-known manner. The coupler housing includes a semi-spherical chamber to receive a hitch ball secured to a towing vehicle. The housing chamber is open to the underside of the coupler such that the coupler is positioned over the hitch ball.

The coupler lock includes a rotatable pin mounted transversely across the housing chamber with ends protruding through the side walls of the coupler. The pin has a flat portion extending longitudinally along the pin. Mounted to a first end of the pin protruding from the coupler is an operating lever which facilitates rotation of the pin and a spring biasing the lever towards a locked position. The second end of the pin includes an aperture for receiving a lock to prevent rotation of the pin. Formed in the exterior wall of the coupler proximate the first end of the pin is a slot within which the biasing spring is seated and forming a flange along side the lever. Upon moving the lever to the open position, the lever and pin may be shifted laterally such that the lever engages the flange holding the lever and pin in an open position. Once the lever is shifted away from the retaining flange the spring will bias the lever to the locked position. Thus, if desired, the lock mechanism can be maintained in the open position freeing the hands of the user. In the locked position, the flat portion of the pin is turned away from the hitch ball such that the pin blocks withdrawal of the ball. As the pin is rotated to the unlocked position, the flat portion will face towards the ball permitting withdrawal past the pin.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIGS. 5a and 5b are partial cross-sectional views showing the lock in the locked and open position; and FIG. 6 is a partial cross-sectional view taken along lines 6—6 of FIG. 4.

DETAILED DESCRIPTION OF A PREFERRED EMBODIMENT OF THE PRESENT INVENTION

Figure 1:
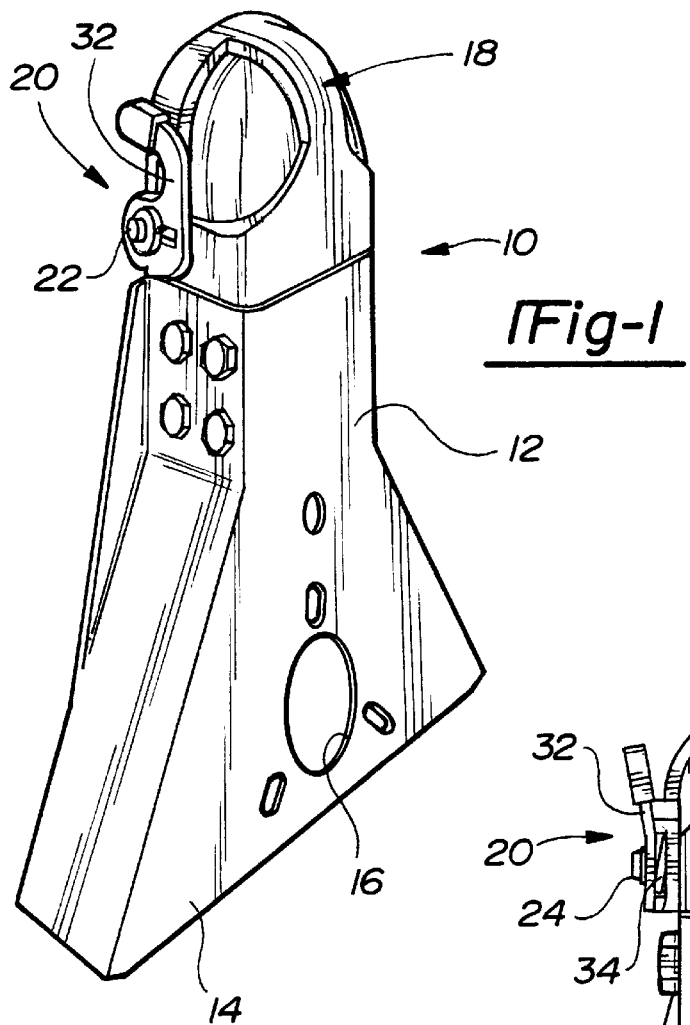
FIG. 1 is a perspective view of a trailer coupler incorporating a lock assembly of the present invention.
Figure 2:
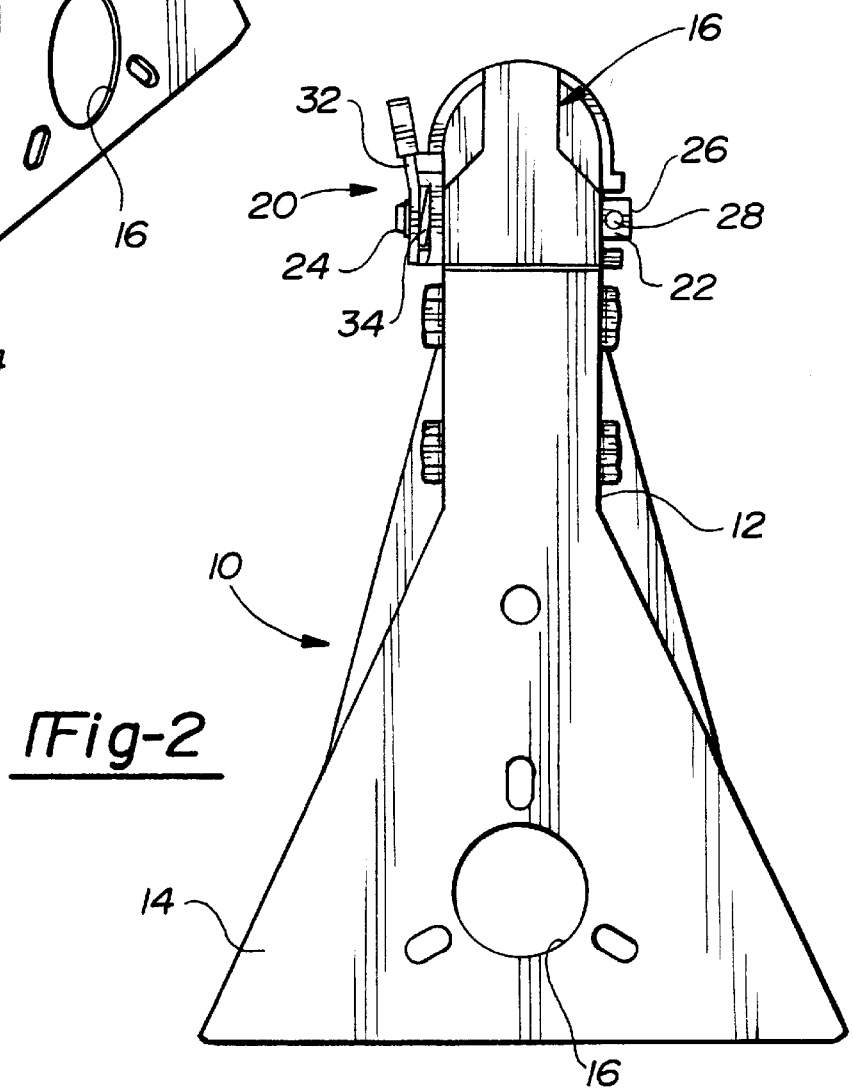
FIG. 2 is a top plan view thereof.
Figure 3:
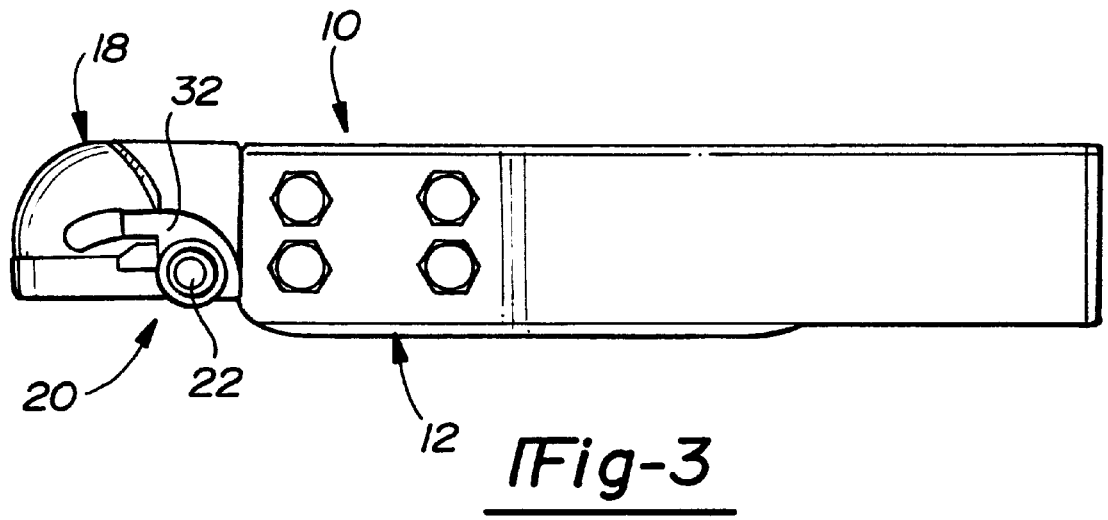
FIG. 3 is a side view thereof.

Referring first to FIGS. 1 through 3, there is shown a coupler 10 adapted to be mounted to a tongue of a trailer (not shown) and designed to be selectively connected to a hitch of a towing vehicle (not shown). As is well known, the coupler 10 is designed to be connected to a hitch ball 100 such that the towing vehicle will pull the trailer. Normally, upon reaching the desired destination, the trailer is disconnected from the towing vehicle by removing the coupler 10 from the vehicle hitch. The coupler 10 of the present invention includes a coupler body 12 having an apron 14 for mounting to the trailer tongue using fasteners or welds. The apron 14 has an opening 16 for receiving a trailer jack to raise and lower the tongue. Disposed at a forward end of the coupler body 12 is a coupler housing 18 having a coupler lock 20 embodying the present invention.

Figure 4:
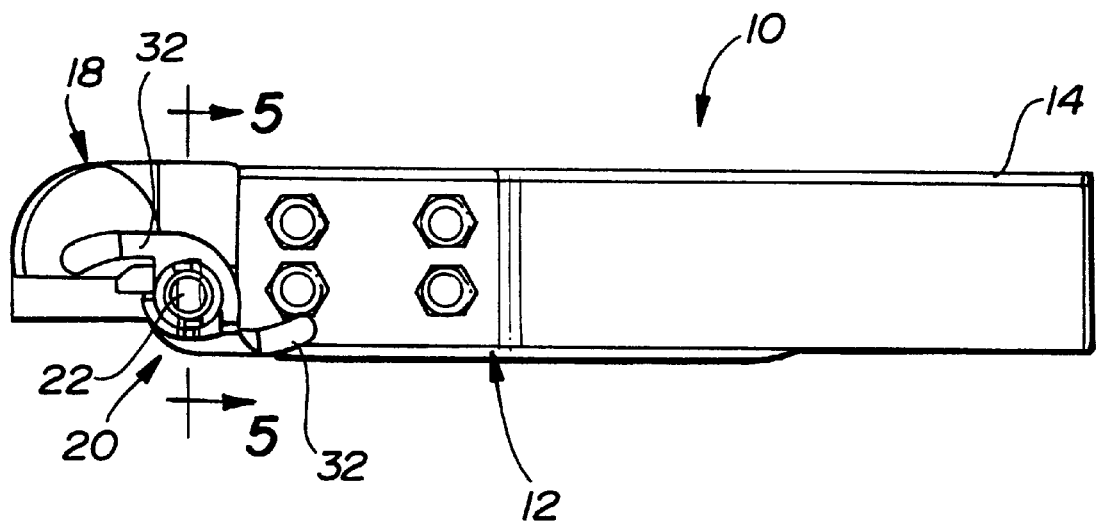
FIG. 4 is a side view of the coupler showing the lock in both the locked and open position.

Referring now to FIGS. 4 through 6, the coupler lock 20 is mounted to the coupler housing 18 to selectively engage the hitch ball 100 to prevent withdrawal of the ball 100. The lock 20 includes a rotatable pin 22 extending transversely through the housing 18. The pin 22 has a first end 24 and a second end 26 extending exteriorly of the housing 18. In a preferred embodiment, the second end 26 of the pin 22 has a throughbore 28 for insertion of a security lock to prevent rotation of the pin 22 and prevent actuation of the lock 20. Extending longitudinally along at least a portion of the pin 22 is a flat portion 30 which is selectively rotated relative to the ball 100 in accordance with the invention as will be subsequently described.

Mounted to the first end of the rotatable pin 22 is an actuating lever 32 and a spring 34 for biasing the lever 32 towards a first locked position. In a preferred embodiment, the biasing spring 34 is a coil spring coaxial with the pin 22 and having a first end secured to the coupler 10 and a second end biasing the lever 32. As is best shown in FIG. 6, formed on the exterior wall of the housing 18 is a well 36 within which the spring 34 is seated. The well 36 forms an outwardly disposed flange 38 which is used to retain the lever 32 is an unlocked position as shown in FIG. 4 against the bias of the spring 34.

Operation of the coupler lock 20 facilitates selective retention of the hitch ball 100 within the housing 18. The coupler lock 20 is shown in an at-rest, locked position in FIGS. 3 and 5a. The lever 32 is pointed forwardly which causes the flat portion 30 of the pin 22 to be disposed away from the hitch ball 100. As a result, withdrawal of the ball 100 is prevented by the pin 22. In order to withdraw the ball 100 from the housing 18, the lever 32 must be rotated rearwardly which rotates the pin 22 such that the flat portion 20 is facing the hitch ball 100. The position of the flat portion 30 provides sufficient clearance for the ball 100 to be withdrawn past the pin 22 and from the coupler 10. Simply releasing the lever 32 will cause it to be biased to the forward locked position. However, upon rotating the lever to the open position, the lever 32 and pin 22 may be shifted transversely into the well 36 such that the flange 38 prevents the lever 32 from returning to the locked position until shifted out from the well 36. As a result, the coupler lock 20 may be maintained in the unlocked position freeing the hands of the user to work with the trailer.

The foregoing detailed description has been given for clearness of understanding only and no unnecessary limitations would be understood therefrom as some modifications will be obvious to those skilled in the art without departing from the scope and spirit of the appended claims.

What is claimed is:

1. A trailer coupler for selectively attaching a trailer to a hitch ball of a towing vehicle, said coupler comprising:

a coupler body having a coupler housing adapted to selectively receive the hitch ball; and a coupler lock mounted to said coupler body for selectively preventing withdrawal of the hitch ball from said coupler housing, said coupler lock including:

a rotatable pin extending transversely through said coupler housing, said pin having a flat portion movable between a front locked position with said flat portion in a rearward position and a second open position with said flat portion in a forward position to provide clearance for selective withdrawal of the hitch ball past said rotatable pin;

an actuating lever mounted to said pin thereby rotating said pin between said first locked position and said second open position, said actuating lever having a retaining shoulder;

means for biasing said actuating lever and pin towards said first locked position; and means for retaining said actuating lever and pin in said second open position, said retaining means including a retaining flange formed on said coupler body, said pin and lever shifting transversely in said second open position to engage said retaining shoulder of said actuating lever with said retaining flange of said coupler body thereby preventing rotation of said pin and lever to maintain said coupler lock in said unlocked position.

2. The coupler as defined in claim 1 wherein said biasing means comprises a coil spring mounted coaxially on said rotatable pin, said spring having a first end connected to said coupler body and a second end engaging said lever to bias said lever towards said first locked position.

3. The coupler as defined in claim 2 wherein said coupler housing includes an exterior well, said spring seated within said well of said coupler housing.

* * * * *